May 5, 1964  L. WIRTZ  3,131,977
SHAFT BEARINGS
Filed Jan. 31, 1961
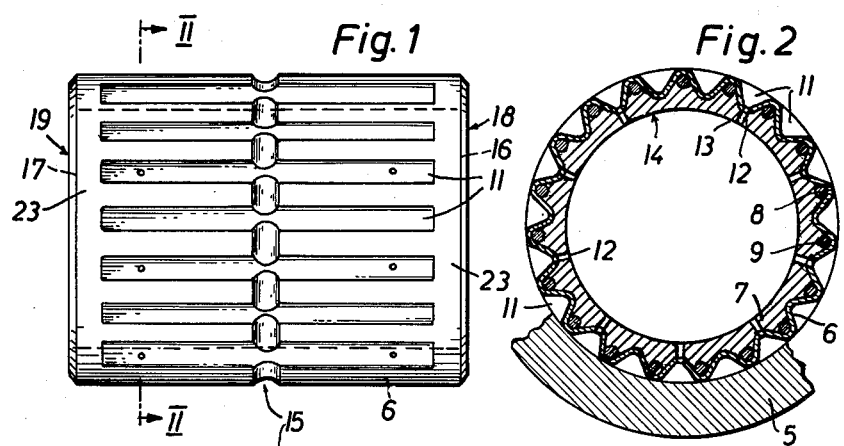
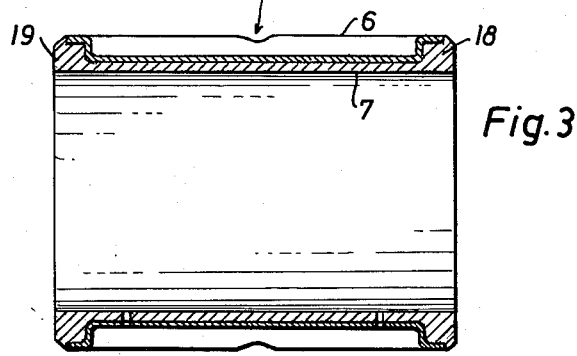
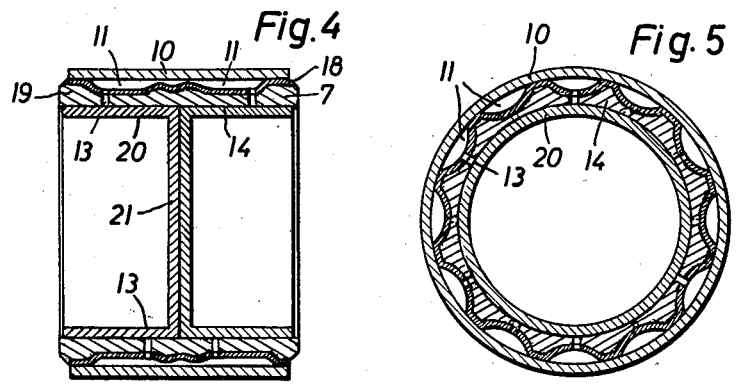
INVENTOR
Leo Wirtz
BY
Clarence K Downing Seebold
ATTYS.

United States Patent Office 3,131,977
Patented May 5, 1964

3,131,977
SHAFT BEARINGS
Leo Wirtz, Hauptstrasse, Hellenthal-Eifel, Germany
Filed Jan. 31, 1961, Ser. No. 86,034
Claims priority, application Germany Feb. 6, 1960
7 Claims.  (Cl. 308—238)

In the journalling of shafts, plain bearing bushes of bearing metals or of abrasion-resisting synthetic materials especially polyamides are often used. While bushes of bearing metals are particularly suitable both as bearings and also for carrying away the heat resulting from the friction, as compared with bushes of synthetic material they have the disadvantages that their sound damping action is lower, they often require refinishing after installation, and they are relatively expensive. On the other hand bushes of synthetic material have the disadvantage of relatively lower mechanical strength so that greater wall thicknesses must be used to achieve a press fit in the bearing body. This and the fact that synthetic materials are worse conductors of heat than metals results in unsatisfactory dissipation of the heat produced by friction. Such bushes of synthetic material are primarily suitable therefore only for low speeds and loads. Furthermore the walls of polyamide bushes take up moisture and lubricants which particularly with thick walls, leads to noticeable dimensional changes.

Plain bearings are already known in which a bearing bush of synthetic material is enclosed by a metallic, spring, clamping bush. A purpose of the invention is to provide a plain bearing with a bearing bush of synthetic material in which better heat transfer is ensured than in the known bearings of synthetic material. Further a plain bearing according to the invention is easily mounted as a unit. To this end according to the invention the metal bush is made continuous and corrugated with flutes or waves which terminate shortly before reaching the ends of the bush, while the bush of synthetic material is heat conductively connected with the metal bush over its whole periphery. The waves or flutes formed in the metal bush give an increased contact surface between the metal bush and the synthetic bush which results in better heat transfer. Further the metal bush is improved and stiffened by the waves or flutes which are preferably pressed in it in the cold condition. The uneven internal surface of the metal bush further mechanically anchors the bush of synthetic material formed therein for example injected or pressure moulded, exceptionally well. All these advantages enable the bush of synthetic material to be made relatively thin walled which further improves the dissipation of heat.

The plain bearing according to the invention can be relatively cheaply produced because its manufacture can take place mainly by shaping without removal of cuttings and the shaping operations can easily be carried out.

The essential features of the invention and further useful developments of the invention will be described with reference to some examples illustrated in the accompanying drawings.

FIGURE 1 shows a bush for a plain bearing in side view.

FIGURE 2 is a section of the line II—II of FIGURE 1.

FIGURE 3 is a longitudinal section of the bush shown in FIGURE 1.

FIGURES 4 and 5 are respectively a longitudinal section and a cross section of another embodiment.

The plain bearing according to FIGURE 2 is supported by a pedestal 5. It consists of a metal bush 6 which is provided with waves and a relatively thin inner bush 7 of synthetic material formed in the metal bush 6. The valleys 8 of the waves facing the bush 7 are completely filled with metal rods or wire 9 of corresponding diameter. As will be seen the diameter of the wires is substantially equal to the total height of the waves. The metal bush 6 with the waves is enclosed by a wrapping sleeve 10 shown in FIGURES 4 and 5 which when the bearing is mounted is stripped off. The pockets 11 formed between the outwardly facing valleys and the sleeve are filled during manufacture with a lubricant, e.g. a lubricating grease which through holes 12 at least reaches the bush 7 and can maintain the lubricating properties thereof, while in a preferred embodiment these holes 12 are carried through the bush 7 at 13 and terminate in the bearing surface 14 of this bush so that the lubricant can directly reach the bearing surface 14 from the chambers 11.

The axially extending chambers 11 are connected together by a peripheral groove 15 which is clearly visible in FIGURE 1 and is arranged at mid length of the bearing. The chambers 11 terminate shortly before reaching the end surfaces 16, 17 of the metal bush 6 so that they are closed here. Accordingly smooth cylindrical boundary surfaces 23 are left at the outer ends of the bush 6 which close the chambers 11.

The production of the metal bush 6 can be effected by pressing it from sheet metal or of thin walled tubing of the same wall thickness. The outer periphery of the metal bush is ground after the pressing operations so that this fits exactly in the cylindrical bearing of the pedestal 5 and the apices of the waves make surface contact in the bore so that satisfactory heat transfer takes place here.

The arrangement of the flutes or waves can be other than longitudinal and instead of one peripheral groove several such grooves can be provided which can moreover take a different course provided only that they establish connection between the chambers.

At the end surfaces 16, 17 of metal bush 6 portions 18, 19 (FIGURE 3) of synthetic material are provided which can be integral with the bush 7 and thus form flanges on the bush 7. Flanges 18 and 19 engage against end surfaces 16 and 17, respectively, of metal bush 6 securing the same and bush 7 together. Engagement of flanges 18 and 19 on bush 7 with end surfaces 16 and 17 on bush 6 prevents relative axial movement between the bushes 6 and 7 when the bearing is pushed into pedestal 5.

According to FIGURES 4 and 5 an internal protecting sleeve 20 corresponding with the outer sleeve 10 can be provided, which prevents the escape of lubricant out of the bores 13 during the storage, transport and installation of the bush. The protecting surface 20 covers the whole bearing surface 14 of the bush 7. This sleeve 20 and also the sleeve 10 can consist of synthetic material pasteboard or the like as it only has to perform a temporary protective function. The outer sleeve 10 is set back a little at one or both ends so that the bush can be more easily entered into its pedestal without lubricant being lost. This entry is further facilitated by the end flanges 18, 19 being chamfered as shown in FIGURES 3 and 4.

A protecting sleeve 20 has a wall 21 perpendicular to the axis which enables the sleeve 20 to be pushed out. Further it stiffens the sleeve 20 so that this can be made relatively thin walled. The wall 21 can also serve to carry inscriptions, for example trademarks or type indications. The sleeve 20 can also be constituted of two cups with their bottoms abutting and forming the wall 21. It will be seen from FIGURE 5 that the corrugations in this example take the form of flutes but it will be understood that this section could be used in the longer bush illustrated in FIGURES 1 to 3 and that the corrugations of FIGURE 2 could be used in the short bush of FIGURES 4 and 5.

I claim:
1. A plain bearing comprising an outer generally cylindrical metal bush having a plurality of circumferentially disposed, longitudinally extending corrugations therein, said corrugations terminating inwardly of each end of said metallic bush and forming pockets adapted to contain a semi-solid lubricant, portions of said corrugations defining openings therein for the passage of the semi-solid lubricant to the interior thereof, and an inner lubricant transmitting bush of synthetic material having an inner bearing surface and being in engagement over a major portion of its circumference with said outer metallic bush, means on said inner bush in engagement with said outer metal bush to prevent relative axial movement between the same when the bearing is inserted in a pedestal.

2. A plain bearing as defined in claim 1, wherein the apex of each of said corrugations include portions defining a transverse groove intermediate the ends thereof, said grooves being in substantial circumferential alignment, to form a lubricant channel intersecting said corrugations and the pockets formed thereby.

3. A plain bearing as defined in claim 1, wherein said means on said inner bush in engagement with said outer metal bush to prevent relative movement between the same comprises radially outwardly extending flanges at opposite ends thereof, and at least one of said flanges being beveled whereby said bearing can be readily inserted into a pedestal.

4. A plain bearing as defined in claim 1, including removable protective means in engagement with substantially the entire bearing surface of said inner bush and wherein said removable protective means comprises a pair of cup-shaped members having transparent bottom walls and disposed in said inner bush with the bottom walls thereof in abutting engagement intermediate the ends of said inner bush.

5. A bearing according to claim 1 comprising heat conductive fillings in the valleys of the metal bush which face the synthetic bush.

6. A bearing according to claim 5 in which the heat conductive fillings consist of cylindrical metal rods the diameter of which is approximately equal to the height of the corrugations in the metal bush.

7. A bearing according to claim 1 also comprising a removable wrapping sleeve upon the metal bush and a filling of lubricant in the pockets formed between the sleeve and the metal bush.

References Cited in the file of this patent
UNITED STATES PATENTS

| | | |
|---|---|---|
| 1,512,190 | Barnes | Oct. 21, 1924 |
| 2,041,774 | McMahon | May 26, 1936 |
| 2,069,569 | Young | Feb. 2, 1937 |
| 2,348,274 | Aker | May 9, 1944 |
| 2,625,448 | Underwood | Jan. 13, 1956 |